Oct. 11, 1966 R. B. COCHRANE 3,278,134

HUB STRUCTURE ADJUSTABLE FOR DIFFERENT REELS

Original Filed June 4, 1964 3 Sheets-Sheet 1

INVENTOR:
Robert B. Cochrane

By Smyth, Roston & Pavitt
Attorneys

INVENTOR:
Robert B. Cochrane

By Smyth, Roston & Pavitt
Attorneys

Oct. 11, 1966 R. B. COCHRANE 3,278,134

HUB STRUCTURE ADJUSTABLE FOR DIFFERENT REELS

Original Filed June 4, 1964 3 Sheets-Sheet 3

INVENTOR:
Robert B. Cochrane

By Smyth, Roston & Pavitt
Attorneys 3,278,134

HUB STRUCTURE ADJUSTABLE FOR DIFFERENT REELS

Robert B. Cochrane, Northridge, Calif., assignor to Minnesota Mining and Manufacturing Company, St. Paul, Minn., a corporation of Delaware Continuation of application Ser. No. 372,641, June 4, 1964. This application Aug. 6, 1965, Ser. No. 479,694
18 Claims. (Cl. 242—68.3)

This is a continuation of my copending application Serial No. 372,641, filed June 4, 1964, now abandoned, entitled "Hub Structure Adjustable for Different Reels."

This invention relates to means for the rotary support of reels in transport systems where strip material such as magnetic recording tape or motion picture film travels from a supply reel through an operating zone to a take-up reel. More particularly stated, the invention is directed to such a rotary support that is adapted for mounting reels of strip material of different widths.

In a tape transport system of a certain type, for example, it is common practice to run ½" tape and 1" tape interchangeably. The reels for the two tape sizes have axial openings of the same diameter but, of course, the reels for the two tape sizes differ in thickness or axial dimension. The problem is to design such a rotary support for quick and convenient changeover from operation with a reel of one axial dimension to operation with a reel of the other axial dimension.

In a conventional tape transport system interchangeable hub structures are employed for the two sizes of reels and a set of hub structures must be dismounted and replaced whenever a changeover is required. This changeover procedure takes time and often requires the use of tools. The procedure is further objectionable because a hub structure that is not in use may be misplaced to cause further loss of time in a subsequent changeover.

The present invention corrects this situation by providing a single hub structure which may be quickly adjusted manually for engagement with reels of the two sizes selectively without the need of any tools whatsoever. Generally described, the invention provides a base structure to receive a reel and a cooperative annular assembly which may be contracted to a diameter to fit into the axial opening of a reel and may be radially expanded into engagement with the reel in the region of the axial opening. The invention further provides control means adjustable to shift the assembly axially as required to conform to the two reel thicknesses and to expand the assembly into engagement with the reels.

The reel-engaging assembly comprises essentially three members, namely, a first annular member with a smooth frusto-conical surface, a resilient ring embracing the smooth conical surface under circumferential tension and therefore tending to climb the conical surface, and a second annular member overhanging the resilient ring to cooperate with the ring.

The outside diameter of both of the annular members is less than the diameter of an axial opening in a reel and when the two annular members are sufficiently spaced apart to permit the resilient ring to climb close to the crest of the frusto-conical surface, the outside diameter of the resilient ring is also less than the diameter of an axial opening in a ring. When the two annular members are moved close together to crowd the resilient ring towards the larger diameter of the conical surface, the resilient ring is stretched to expand to a diameter larger than the given diameter. Since the tensioned resilient ring tends to climb the frusto-conical surface and thus tends to separate the two annular members of the assembly, the resilient ring biases the assembly for axial elongation and corresponding radial contraction. The normally axially elongated assembly may be compressed longitudinally, however, to cause radial expansion of the yielding ring into engagement with a reel.

The assembly may simply expand into frictional engagement with the inner circumferential surface of a reel to anchor the reel on the hub structure. A feature of the preferred practice of the invention, however, is that the expanded resilient ring frictionally engages the rim of the axial opening of the reel in such manner that it also overhangs the rim of the axial opening to serve as a positive stop to prevent axial shift of the reel away from the hub structure.

The features and advantages of the invention may be understood from the following detailed description and the accompanying drawings.

In the drawings which are to be regarded as merely illustrative:

Figures 1, 2:
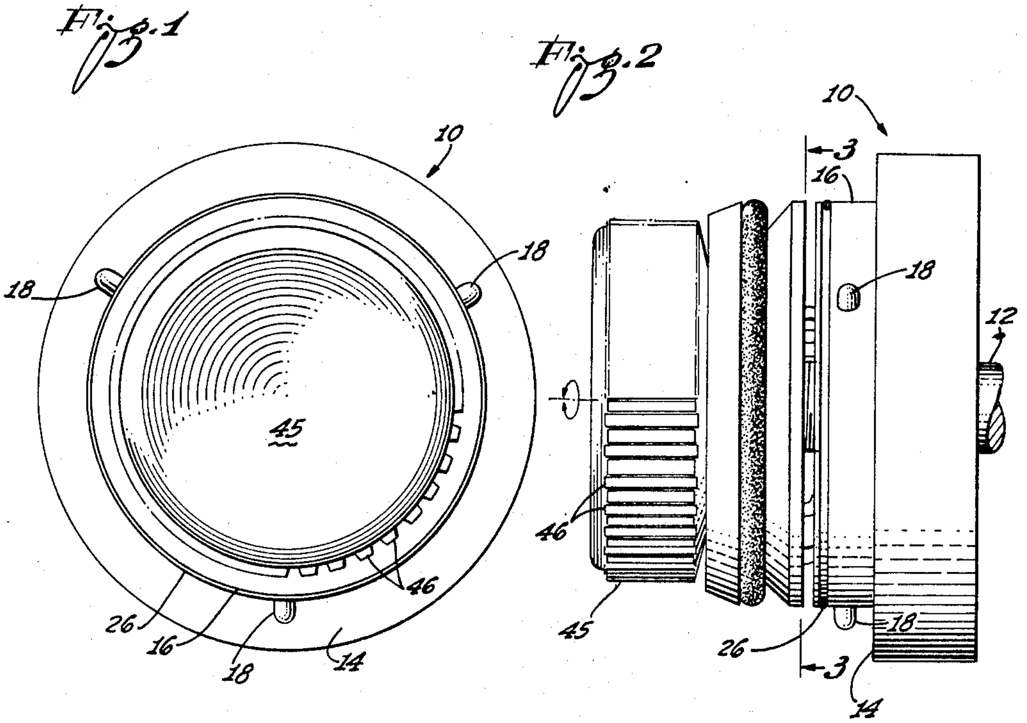
FIG. 1 is a plan view of the presently preferred embodiment of the invention.
FIG. 2 is a side elevational view of the embodiment.

As best shown in FIGS. 1 and 2, the selected embodiment of the invention includes a circular base structure, generally designated 10, which fixedly embraces a spindle 12 by means of which the device may be mounted on a suitable rotary support means (not shown) for supporting a reel. The rotary support means, for example, may be power actuated for support of a take-up reel or may be frictionally retarded for support of a supply reel.

Figure 4:
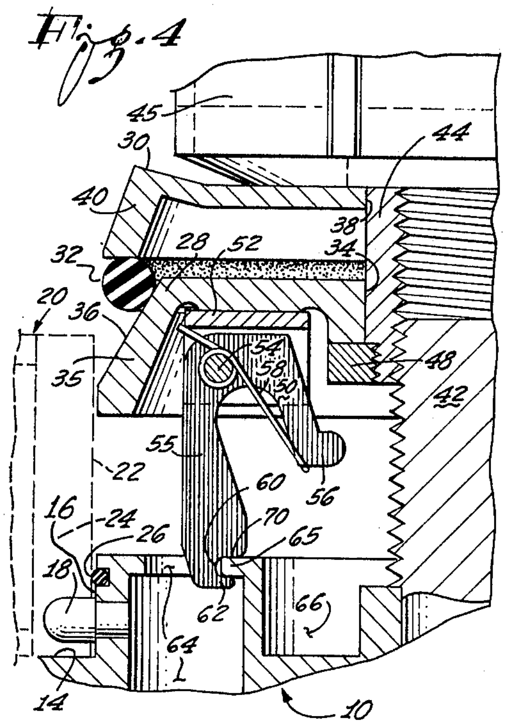
FIGS. 4 and 5 are enlarged sectional views showing how latch means carried by the expandable assembly releasably engages the base structure to block movement of the assembly towards the base structure to permit the assembly to be expanded into engagement with a reel of the greater axial dimension.
Figure 6:
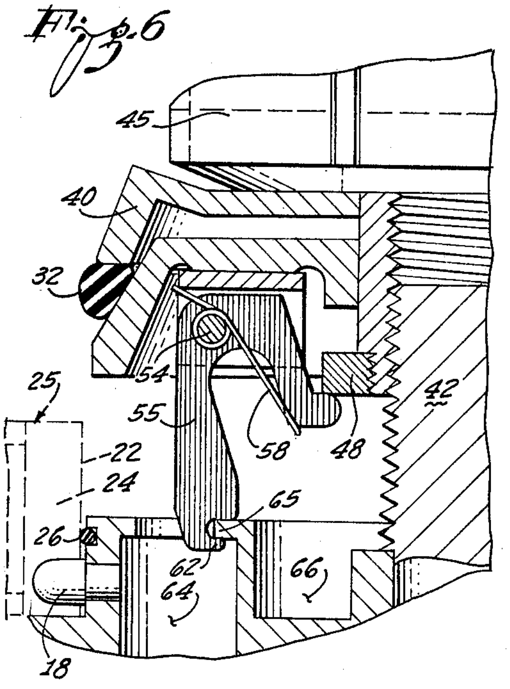
FIGS. 6 and 7 are similar views showing how in the absence of a reel of the larger axial dimension, the latch means may be released to permit further travel of the expandable assembly towards the base structure.

The base structure 10 provides a radial support surface 14 to abut one face of a reel and the base structure is further formed with a concentric boss 16 to fit into the axial opening of a reel to center the reel. In a well known manner, the boss 16 is provided with three radial lugs 18 each of which is positioned and dimensioned to engage a longitudinal groove in the axial opening of a reel to drive the reel. FIG. 4 shows in dotted lines a reel, generally designated 20, of the larger axial dimension, which reel has an axial opening with an inner circumferential surface 22 and with a longitudinal groove 24 for engagement by the corresponding lug 18. In like manner, FIG. 6 shows in dotted lines a reel 25 of lesser axial dimension with an inner circumferential surface 22 and a longitudinal groove 24. To cause these reels to fit around the boss 16 in a snug manner, the boss is provided with a circumferential groove in which is mounted a suitable O-ring 26.

As shown in FIGS. 4–10, the mechanism for releasably engaging a reel includes an expansile annular assembly comprising a first annular member 28, a second annular member 30 and a resilient ring in the form of an elastomeric O-ring 32. The first annular member 28 has an axial aperture 34 and is formed peripherally with a circumferential flared flange 35 having a smooth truncated conical surface 36, the major diameter of the conical surface being less than the diameter of an axial opening in a reel. The unrestrained diameter of the resilient ring 32 is less than the minor diameter of the conical surface 36 with the consequence that the resilient ring constantly tries to climb the conical surface, i.e. seeks to shift axially along the conical surface in the direction of decreasing diameter of the surface.

The second annular member 30 is provided with an axial aperture 38 and is formed with a flared circumferential flange 40 that overhangs the flared flange 35 of the first annular member and abuts the resilient ring 32 on the side of the ring to oppose the tendency of the resilient ring to climb the conical surface 36. It is apparent that the resilient ring 32 continuously presses against the second annular member 30 to tend to elongate the three-member assembly axially. Thus the three-member assembly is biased for axial elongation to contract the outside diameter of the resilient ring to less than the diameter of an axial opening in a reel 20 or 25.

Figure 5:
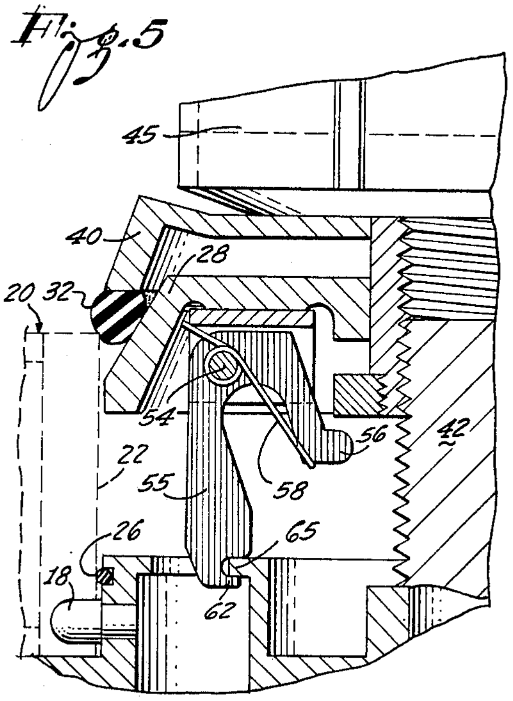

FIG. 4 shows the assembly of the three members 28, 30 and 32 axially elongated to permit the resilient ring 32 to contract to less than the inside diameter of an axial opening in a reel. When the three-member assembly is axially compressed as shown in FIG. 5, the flared flange 40 of the second annular member 30 forces the resilient ring 32 down the conical surface 36 to expand the resilient ring to an outside diameter greater than the diameter of the axial opening of a reel. Thus the three-member assembly is in effect radially expandable in response to axial compression.

In the selected embodiment of the invention, the control structure to carry the radially expandable assembly towards and away from the base structure 10 comprises a screw threaded post 42 extending axially from the base structure together with a manually rotatable internally threaded control collar 44 that travels along the post by screw action. In the construction shown, the collar 44 is united with a circular handle or knob 45 which overhangs and conceals the outer end of the post 42. As shown in FIGS. 1 and 2, the knob 45 may be formed with spaced longitudinal ribs 46 to facilitate manual rotation.

The two annular members 28 and 30 slidingly embrace the control collar 44 with the axially outward movement of the annular member 30 limited by the knob 45 and the axially inward movement of the annular member 28 limited by a stop nut 48 that is threaded onto the inner end of the control collar. Thus the knob 45 and the stop nut 48 serve as a pair of axially spaced shoulders to confine the radially expandable assembly comprising the two annular members 30 and 28 together with the resilient ring 32, the knob and stop nut being spaced far enough apart to permit the expandable assembly to relax with the resilient ring at its minimum diameter.

Figure 3:
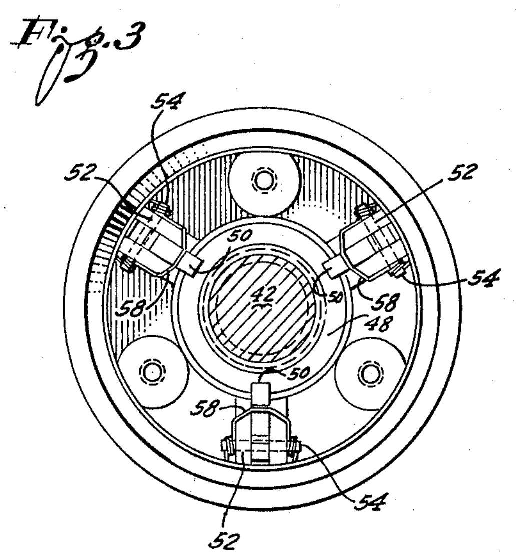
FIG. 3 is a transverse section taken along the line 3—3 of FIG. 2 showing the three latches that are carried by the expandable assembly.

Suitable latch means for the purpose of the invention may comprise three latches spaced circumferentially apart on the underside of the annular member 28 as shown in FIG. 3, each latch comprising a latch member 50 mounted on an inverted U-shaped bracket 52. Each bracket 52 forms a guide slot for the corresponding latch member 50 with the latch member pivotally mounted on a cross pin 54 that spans the slot.

As shown in FIG. 4, for example, each latch member 50 is formed with a main latch arm 55 and a control arm 56 and the latch member is biased towards its engagement position by a suitable torque spring 58 that embraces the cross pin 54 and acts against the control arm. The main arm 55 of each latch member 50 is provided with a lateral recess 60 which forms a hook finger 62 on the end of the arm. Each latch arm 55 extends into a corresponding recess in the form of a radial guide slot 64 in the base structure 10 and the radial slot forms an element 65 for engagement by the latch arm recess 60.

Figure 7:
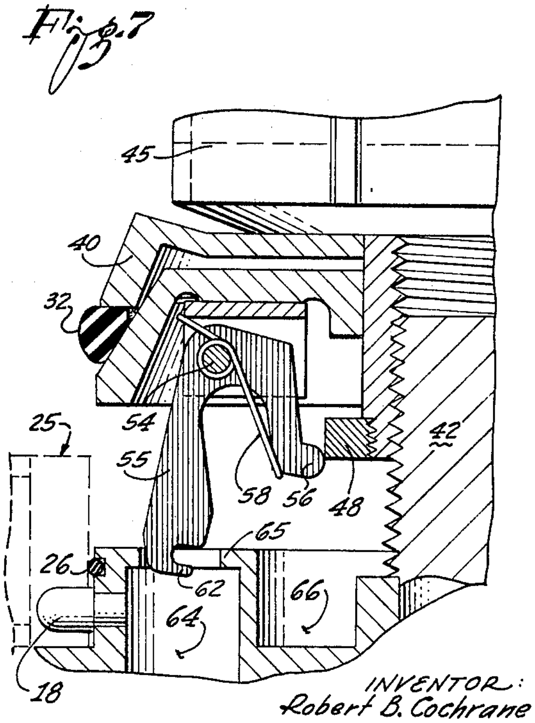

As may be seen in FIG. 4, the torque spring 58 biases the latch member 50 counterclockwise towards its effective latching position and release force may be applied to the control arm 56 of the latch member in opposition to the torque spring to swing the latch member to a release position shown in FIG. 7. When the latch member is in the release position shown in FIG. 7, the main arm of the latch member may be advanced into the slot 64 and to permit this advance the base structure 10 is formed with an annular recess 66 to clear the advancing control arm 56 of the latch member.

FIG. 4 shows the control collar 44 and the associated control knob 45 adjusted to place the expandable assembly at its outer limit position where the annular member 28 is releasably immobilized by the latch member 50. The hook fingers 62 of the latch engage the inner surfaces of the elements 65 of the base structure to prevent axially outward movement of the annular member, and shoulders 70 of the latch members abut the outer surfaces of the elements to prevent axial inward movement of the annular member.

With the parts in the positions shown in FIG. 4, rotation of the knob 45 and the sleeve 44 to advance the knob 45 towards the base structure 10 results in the knob crowding the annular member 30 against the resilient ring 32 to force the resilient ring down the slope of the conical surface 36 of the annular member 28 with consequent radial expansion of the resilient ring. If a reel 20 of the larger axial dimension is mounted on the base structure 10 as indicated in FIG. 4, the expanding resilient ring 32 is forced against the inner rim of the reel 20 as shown in FIG. 5. The resilient ring has deformed under pressure to frictionally engage the inner rim of the reel and to overhang the inner rim of the reel to press the reel against the support surface 14 of the base structure 10 and thus prevent axial separation of the reel from the base structure.

If there is no reel 20 of the greater axial dimension on the base structure for pressure contact by the resilient ring 32, the knob 45 may be further rotated to advance the control collar 44 towards the base structure from the position shown in FIG. 5. When the control collar 44 advances to the position shown in FIG. 6, the stop nut 48 makes contact with the control arm 56 of the latch member 50 and further advance of the control collar results in the stop nut cooperating with the control arm to swing the latch member to its released position as shown in FIG. 7.

Figures 8, 9, 10:
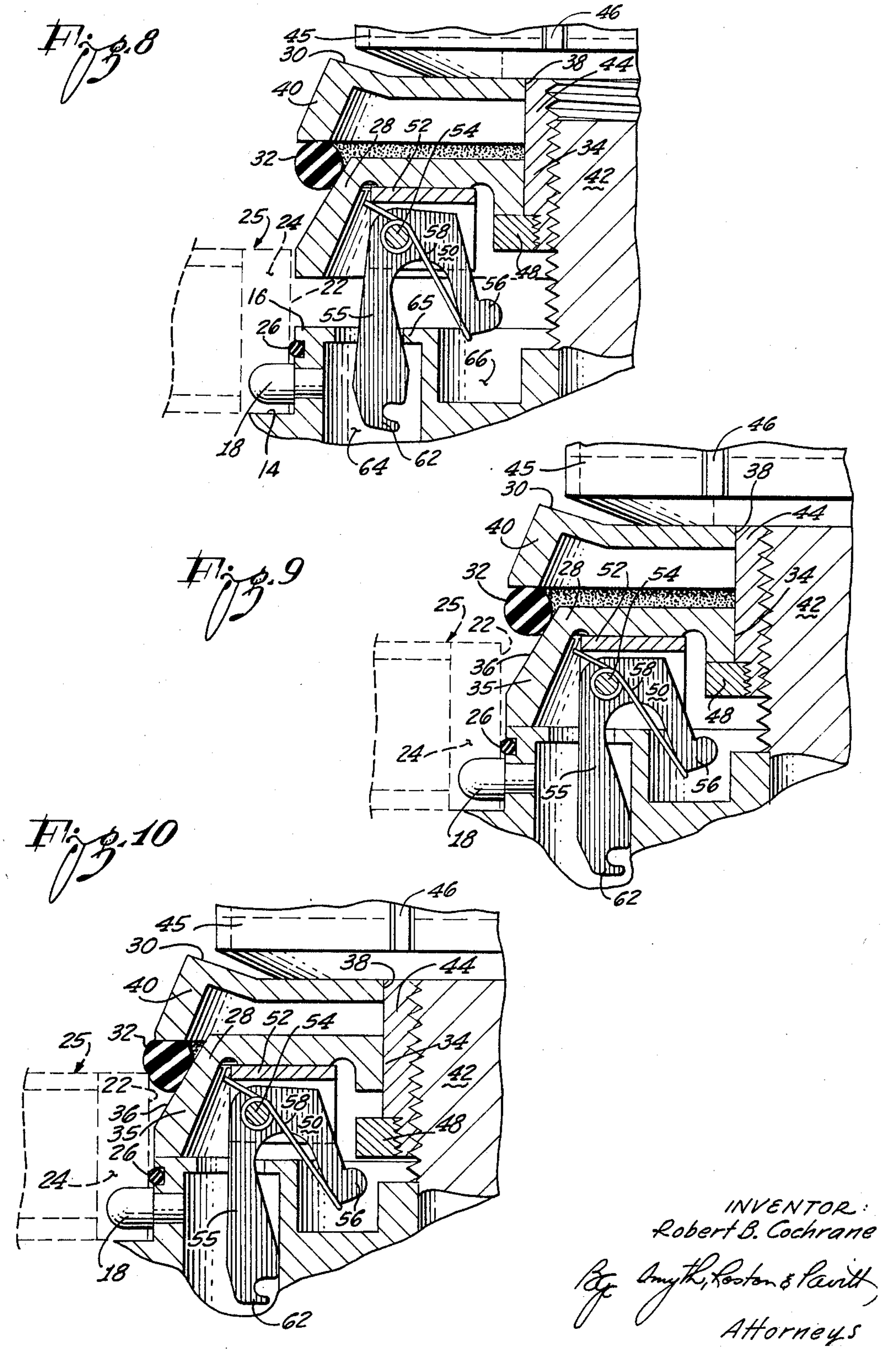
FIGS. 8, 9 and 10 are similar views showing successive stages in the operation of the device for engagement with a reel of the lesser axial dimension.

As soon as the latch member is swung to its released position the expanded resilient ring 32 acts to elongate the assembly, i.e. to separate the two annular members 28 and 30 thus causing the inner annular member 28 to shift to the position shown in FIG. 8. With the parts positioned as shown in FIG. 8 the resilient ring 32 is sufficiently contracted in diameter to permit a reel 25 of the lesser axial dimension to be placed on the base structure as indicated by the dotted lines.

The knob 45 may then be rotated to continue the advance of the control collar 44 to the position shown in FIG. 9 where the inner annular member 28 comes into abutment with the base structure 10 to block further advance of the inner annular member. Continued rotation of the control knob 45 and advance of the control collar 44 from the position shown in FIG. 9 to the position shown in FIG. 10 causes the annular member 30 to advance towards the annular member 28 to crowd the resilient ring 32 down the conical surface 36 against the inner rim of the reel 25 as shown. It is apparent that in FIG. 10 the resilient ring 32 secures the reel of the lesser axial dimension in the same manner as it secures the reel of the greater axial dimension in FIG. 5.

If the knob 45 is reversely rotated for retraction of the knob and the control collar 44 from the positions shown in FIG. 10 the initial result is axial elongation of the three-member assembly to the configuration shown in FIG. 9 followed by retraction of the annular member 28 from the base structure as shown in FIG. 8. With continued retraction of the knob and the control collar, the stop nut 48 eventually carries the annular member 28 high enough for the spring biased latch member 50 to engage the element 65 as shown in FIG. 5 to stop the annular member 28 at its outer limit position and thereby limit further retraction of the control sleeve.

My description in specific detail of the selected embodiment of the invention will suggest various changes, substitutions and other departures from my disclosure within the spirit and scope of the appended claims.

I claim:

1. A rotary support for interchangeably mounting two reels having axial openings of a given diameter and having two different axial dimensions, comprising:

a first circular means dimensioned to enter an axial opening of a reel and having a peripheral conically curved surface;

a resilient ring embracing the conically curved surface, the ring being under circumferential tension to tend to climb the conical surface;

a second circular means to push the resilient ring down the conically curved surface to expand the ring into pressure engagement with a reel;

means to shift the first circular means axially to a first position for engagement of the resilient ring with a reel of the greater axial dimension and to a second position for engagement of the resilient ring with a reel of the lesser axial dimension; and means to actuate said second circular means at each of the two positions to expand the resilient ring for engagement with a reel.

2. A rotary support for interchangeably mounting two reels having axial openings of a given diameter and having two different axial dimensions, comprising:

a rotary base structure having a support surface to abut one face of a mounted reel;

an annular reel-engaging assembly having a minimum diameter less than the given diameter to permit the assembly to be inserted into the axial openings of the reels, said annular assembly being axially contractible and being radially expandable from its minimum diameter in response to its axial contraction, said assembly being biased to tend to assume its minimum diameter;

control means for the annular assembly including axial structure extending from the base structure to the assembly, the control means being manually operable to shift the assembly axially towards and away from the base structure;

means to block the path of axial movement of the assembly towards the base structure at a first point and at a second point selectively and to cooperate at each point with the control means to compress the assembly axially to cause radial expansion of the assembly, the first point being located for radial expansion of the assembly into engagement with the region of the axial opening of the reel of the greater axial dimension, the second point being located for radial expansion of the assembly into engagement with the reel of the lesser axial dimension.

3. A combination as set forth in claim 2 in which said assembly includes:

a member having a conical surface with a maximum diameter slightly less than the given diameter;

a resilient ring embracing the conical surface under circumferential tension to cause the ring to tend to shaft axially along the surface in the direction of decreasing diameter of the surface; and annular means of less than given diameter to force said resilient ring along the conical surface in the axial direction of increasing diameter of the conical surface thereby to expand the ring to an outside diameter greater than the outside diameter of the conical surface for engagement with the region of the axial opening of a reel.

4. A combination as set forth in claim 3 in which the resilient ring is an elastomeric O-ring.

5. A rotary support for interchangeably mounting two reels having axial openings of a given diameter and having two different axial dimensions, comprising:

a rotary base structure having a support surface to abut one face of a mounted reel;

an annular reel-engaging assembly having a minimum diameter less than the given diameter to permit the assembly to be inserted into the axial openings of the reels, said annular assembly being axially contractible and being radially expandable from its minimum diameter in response to its axial contraction, the assembly being resiliently biased to tend to assume its minimum diameter;

control means including axial structure extending from the base structure to the assembly, the control means being manually operable to shift the assembly axially towards and away from the base structure;

a first means carried by the assembly to releasably engage the base structure to block movement of the assembly towards the base structure at a first point on the path of axial movement of the assembly towards the base structure to cooperate with the control means to compress the assembly axially to cause radial expansion of the assembly; and a second means carried by the assembly to engage the base structure to block movement of the assembly towards the base structure at a second subsequent point on the path of axial movement of the assembly towards the base structure to cooperate with the control means to compress the assembly axially to cause radial expansion of the assembly, the first point being located for radial expansion of the assembly into engagement with the region of the axial opening of the reel of the greater axial dimension, the second point being located for radial expansion of the assembly into engagement with tht reel of the lesser axial dimension.

6. A rotary support for interchangeably mounting two reels having axial openings of a given diameter and having two different axial dimensions, comprising:

a rotary base structure having a support surface to abut one face of a mounted reel and having a boss portion to fit into the axial opening of the reel;

an annular assembly having a minimum diameter less than the given diameter to permit the assembly to be inserted into the axial openings of the reels, the annular assembly including an outer end member, an inner end member and resilient means between the two members, the annular assembly being axially contractible against the resistance of the resilient means and being radially expandable from its minimum diameter in response to axial contraction, the assembly being resiliently biased for axial expansion to tend to assume its minimum diameter;

control means extending axially through the assembly to the base structure and manually operable to shift the assembly axially towards and away from the base structure, the control means having two axially spaced portions straddling the assembly;

releasable means carried by the inner end member to the assembly to engage the base structure to block axial movement of the inner end member towards the base structure at a point on the path of axial movement of the inner end member towards the base structure whereby continued operation of the control means after the inner end member reaches the point causes axial contraction of the assembly with consequent radial expansion of the assembly, said point being located for expansion of the assembly into engagement with the region of the axial opening of the reel of the greater axial dimension, said inner end member being adapted to abut the base structure at a subsequent point on the path whereby continued movement of the inner end member by the adjustment means after release of the releasable means causes axial contraction of the assembly with consequent radial expansion of the assembly for engagement thereby with the region of the axial opening of the reel of the lesser axial dimension.

7. A combination as set forth in claim 6 in which said boss is formed with a circumferential groove;

and in which an O-ring seats in the groove for snug fit with the inner circumferential surface of the mounted reel.

8. A rotary support for interchangeably mounting two reels having axial openings of a given diameter and having two different axial dimensions, comprising:

a rotary base structure having a support surface to abut one face of a mounted reel and having a boss portion to fit into the axial opening of the reel;

a threaded post extending axially from the base structure;

a manually rotatable collar embracing the post in screw threaded engagement therewith for movement by screw action towards and away from the base structure;

a first annular means carried by the collar and having a truncated conical surface of a major diameter less than the given diameter;

a resilient ring embracing the conical surface with the ring under circumferential tension to tend to shift axially along the conical surface in the direction of decreasing diameter of the surface;

a second annular means on the collar abutting the ring on the side of the ring to oppose the axial shift, the two annular means being relatively movable axially towards each other to shift the resilient ring in the opposite direction to expand the ring into engagement with the region of the axial opening of a reel; and means to block movement of the first annular means at two spaced points selectively on its path of movement towards the base assembly to cause retraction of the second annular means towards the first annular means when the collar travels towards the base structure, one of the two points being located to cause the second annular means to expand the resilient ring into engagement with the reel of the larger axial dimension, the other of the two points being located to cause the second annular means to expand the ring into engagement with the reel of the lesser axial dimension.

9. A rotary support for interchangeably mounting two reels having axial openings of a given diameter and having two different axial dimensions, comprising;

a rotary base structure having a support surface to abut one face of a mounted reel and having a boss portion to fit into the axial opening of the reel;

a threaded post extending axially from the base structure;

a manually rotatable collar embracing the post in screw threaded engagement therewith for movement by screw action towards and away from the base structure;

a first annular means carried by the collar and having a truncated conical surface of a maximum diameter less than the given diameter;

a resilient ring embracing the conical surface with the ring under tension to tend to shift axially along the conical surface in the direction of decreasing diameter of the surface;

a second annular means on the collar abutting the ring on the side of the ring to oppose the axial shift of the ring, the two annular means being relatively movable axially towards each other to shift the resilient ring in the opposite direction to expand the ring into engagement with the region of the axial opening of a reel; and latch means carried by the first annular means to releasably engage the base structure to block movement of the first annular means towards the base structure at a given point spaced from the base structure to cooperate with the collar to cause the second annular means to expand the resilient ring into engagement with the reel of the greater axial dimension, the base structure blocking the advance of the first annular means at a second subsequent point to cooperate with the collar to cause the second annular means to expand the resilient ring into engagement with the reel of the lesser axial dimension.

10. A combination as set forth in claim 9 in which in the absence of a reel of the greater axial dimension, said latch means is releasable in response to continued advance of the collar towards the base structure after the resilient ring is expanded.

11. A rotary support for interchangeably mounting two reels having axial openings of a given diameter and having two different axial dimensions, comprising:

a rotary base structure having a support surface to abut one face of a mounted reel and having a boss portion to fit into the axial opening of the reel;

a threaded post extending axially from the base structure;

a manually rotatable collar embracing the post in screw threaded engagement therewith for movement by screw action towards and away from the base structure;

said collar having two axially spaced shoulders facing towards each other;

a first annular means slidingly embracing the collar between the two shoulders and having a trunctated conical surface of a major diameter less than the given diameter;

a resilient ring embracing the conical surface with the ring under circumferential tension to tend to shift axially along the surface in the direction of decreasing diameter of the surface;

a second annular means embracing the collar between the two shoulders and overhanging the first annular means, the second annular means abutting the resilient ring on the side to oppose the axial shift whereby the resilient ring biases the two annular means apart, said collar being movable by screw action to carry the first annular means into abutment with the base structure whereby continued movement of the collar thereafter advances the second annular means towards the first annular means to cause the first annular means to expand the resilient ring into engagement with the reel of the lesser axial dimension; and latch means carried by the first annular means to releasably engage the base structure to block movement of the first annular means towards the base structure at a given point spaced from the collar towards the base structure when the given point is reached advances the second annular means towards the first annular means to a given degree to cause the first annular means to expand the resilient ring into engagement with the reel of the greater axial dimension, said latch means being in the path of advance of the collar to be released thereby in the absence of a reel of the greater axial dimension.

12. A combination as set forth in claim 11 in which said base structure is provided with a recess to receive the latch means when the first annular means abuts the base strutcure.

13. A rotary support for interchangeably mounting two reels having axial openings of first and second axial dimensions, including:

a rotatable base structure, first means movable in an axial direction through first and second increments of distance where the second increment of distance extends from the first increment of distance, second means operatively coupled to the first means and responsive to the movement of the first means through the first increment of distance for cooperating with the first means to couple the rotatable base structure to the reel of first axial dimensions and responsive to the movement of the first means through the second increment of distance for cooperating with the first means to couple the rotatable base structure to the reel of second axial dimensions, third means having a first position to prevent the movement of the first means through the second increment of distance and having a second position to provide for the movement of the first means through the second increment of distance, and fourth means responsive to the movement of the first means through the first axial increment of distance in the absence of the reel of the first axial dimensions for obtaining a movement of the third means from the first position to the second position.

14. A rotary support for interchangeably mounting two reels having axial openings of first and second axial dimensions, including:

a rotatable base structure, first means having a first radial position displaced from the reels of the first and second axial dimensions and movable to a second radial position to couple the reels to the rotatable base structure, second means movable in the axial direction and disposed relative to the first means to obtain a movement of the first means to the second radial position upon the movement of the second means through a first axial distance and disposed relative to the first means to obtain a movement of the first means to the second radial position upon the movement of the second means through a further axial distance after the movement of the first means through the first axial distance, third means operatively coupled to the second means and operative to prevent the movement of the second means through the further axial distance in the presence of the reel of the first axial dimension, and fourth means operatively coupled to the third means for rendering the third means inoperative in the absence of the reel of the first axial dimension.

15. A rotary support for interchangeably mounting two reels having axial openings of first and second axial dimensions, including:

a rotatable base structure, first means movable in the axial direction and having first and second displaced positions in the axial direction and operative to couple the base structure in the first and second positions respectively to the reels of first and second axial dimensions, second means axially displaced from the first means and movable relative to the first means in the axial direction to operate upon the first means in the first position of the first means for obtaining a coupling of the rotatable base structure by the first means to the reel of the first axial dimensions and to operate upon the first means in the second position of the first means for obtaining a coupling of the rotatable base structure by the first means to the reel of the second axial dimensions, and third means operatively coupled to the first means and operative in accordance with an absence of the reel of the first axial dimensions in the first position of the first means and operative in accordance with an axial movement of the second means for obtaining a displacement of the first means from the first position to the second position.

16. A rotary support for interchangeably mounting two reels having axial openings of first and second axial dimensions, including:

a rotatable base structure, first means movable in the axial direction and having first and second displaced positions in the axial direction, second means movable in the axial direction in displaced relationship to the first means, flexible means disposed between the first and second means and responsive to a first axial movement of the second means toward the first means, with the first means in the first position, to become clamped by the first and second means to the reel of the first axial dimensions and responsive to a further axial movement of the second means toward the first means, with the first means in the second position, to become clamped by the first and second means to the reel of the second axial dimensions, and means operatively coupled to the first means and operative in accordance with an absence of the reel of the first axial dimensions for obtaining a displacement of the first means from the first position to the second position.

17. A rotary support for interchangeably mounting two reels having axial openings of first and second axial dimensions, including:

a rotatable base structure, first means responsive to pressure for providing a variable radius upon the exertion of an axial pressure against such means and for pressing against the reels to hold the reels in position relative to the base structure, second means operatively coupled to the first means for moving axially against the first means to obtain a variation in the radius of the first means for a holding of the reel of the first axial dimension against the base structure, and means operative in accordance with an absence of the reel of the first axial dimension for providing a further displacement of the first means in the axial direction to provide for a further movement of the second means into pressing relationship with the first means to obtain a holding of the reel of the second axial dimension against the base structure.

18. A rotary support for interchangeably mounting two reels having axial openings of first and second axial dimensions, including:

a base structure for receiving the reels having the axial openings of the first and second axial dimensions, first means adjustable in axial position, second means adjustable in axial position and displaced axially from the first means and movable axially between first and second positions, third means disposed between the first and second means and responsive to a first adjustment of the first means in axial position in the first axial position of the second means to become clamped between the first and second means and to become clamped by the first and second means to the reel of first axial dimensions, and fourth means operatively coupled to the third means and operative in accordance with an absence of the reel of first diameter upon the first axial adjustment of the first means for providing for a displacement of the second means in the axial direction to the second axial position to obtain a clamping of the third means between the first and second means and a clamping of the third means by the first and second means to the reel of second axial dimensions upon a further adjustment of the first means in the axial direction and to obtain a clamping of the base structure to the reel of second axial dimensions.

References Cited by the Examiner

UNITED STATES PATENTS

| | | | |
|---|---|---|---|
| 1,981,563 | 11/1934 | McIlvired et al. | 242—68.3 X |
| 2,889,123 | 6/1959 | Hayden | 242—68.3 |
| 3,083,927 | 4/1963 | Prosin | 242—68.3 |

FRANK J. COHEN, *Primary Examiner.*

MERVIN STEIN, *Examiner.*

N. L. MINTZ, *Assistant Examiner.*